Sept. 15, 1953 J. R. PICON 2,651,800
WINDSHIELD WIPER
Filed June 28, 1946 2 Sheets-Sheet 1
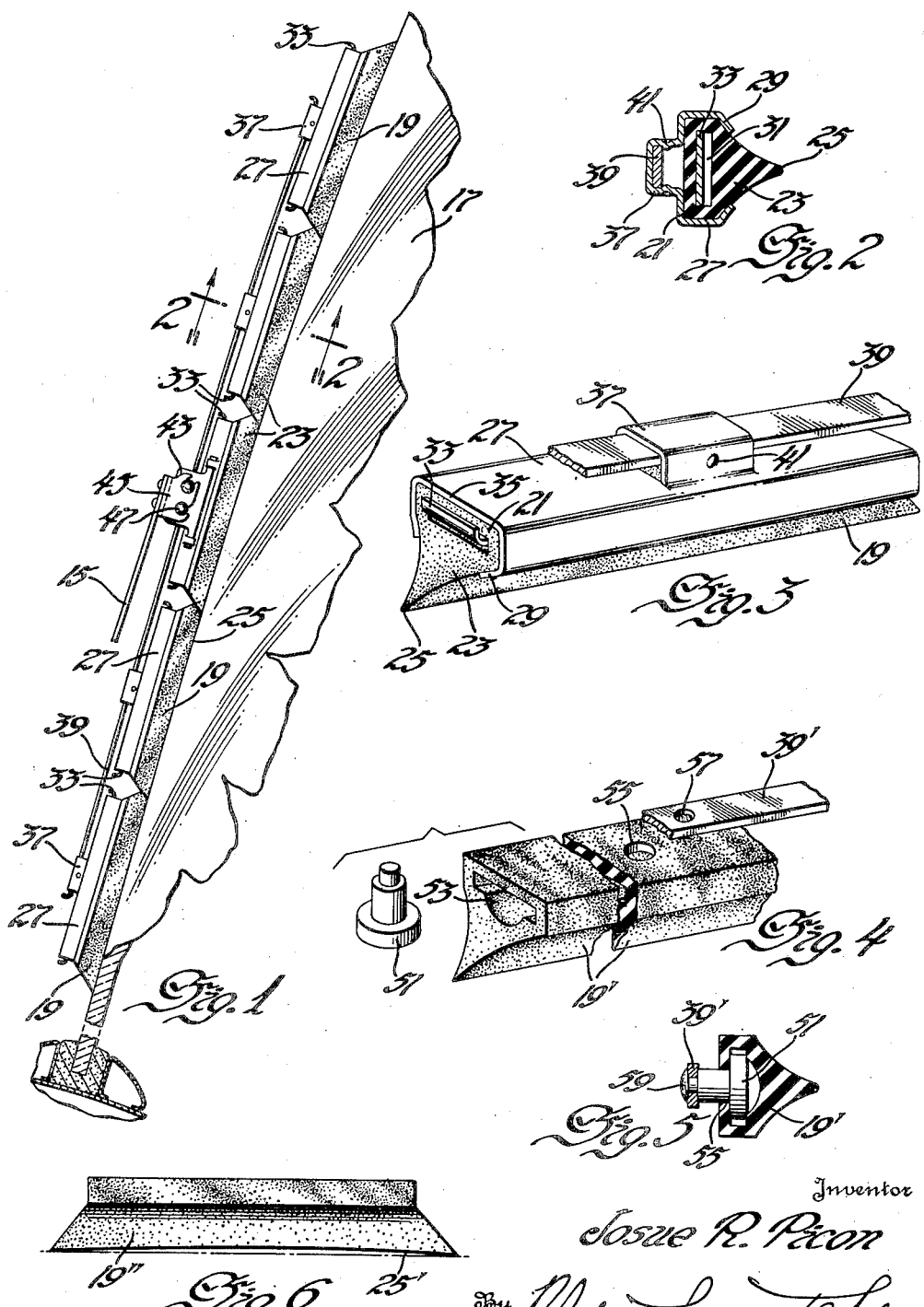

Sept. 15, 1953 J. R. PICON 2,651,800
WINDSHIELD WIPER
Filed June 28, 1946 2 Sheets-Sheet 2
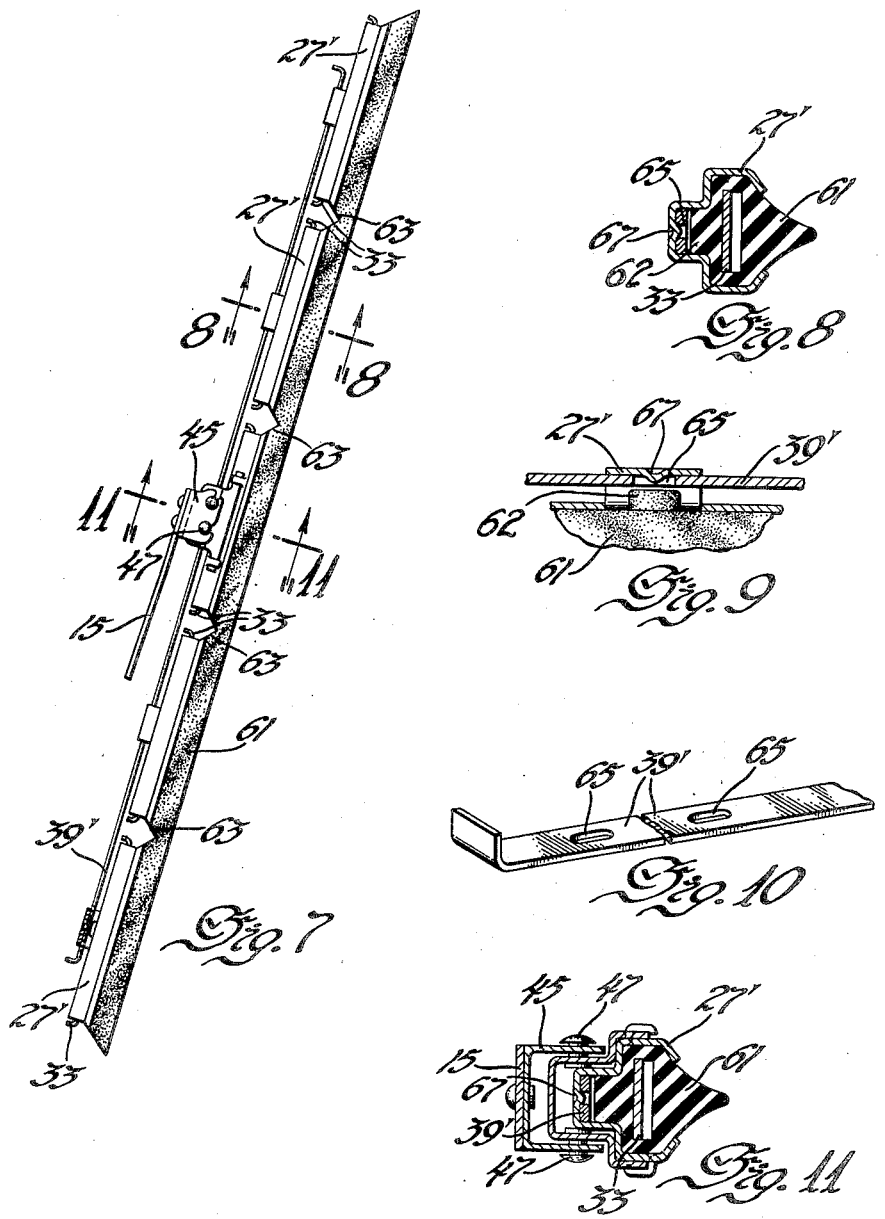
Inventor
Josue R. Picon
By Blackmore, Bruce & Flint
Attorneys

UNITED STATES PATENT OFFICE 2,651,800

WINDSHIELD WIPER

Josue R. Picon, Detroit, Mich., assignor to General Motors Corporation, Detroit, Mich., a corporation of Delaware Application June 28, 1946, Serial No. 680,130

12 Claims. (Cl. 15—245)

This invention relates to windshield wipers and particularly to the cleaning blade which is carried by the usual swinging arm.

The primary object of the invention is to construct the blade in such a way that it may effectively clean a windshield glass having a curved surface. Other objects include the attainment of the major object with a construction which shall be comparatively inexpensive.

On the accompanying drawings:

Fig. 1 is a view in elevation of one embodiment of the invention.

Fig. 2 is a section on line 2—2 of Fig. 1.

Fig. 3 is a perspective of one of the elements of the wiper blade.

Fig. 4 is a similar view of another form with parts disassembled.

Fig. 5 is a transverse section through this second form with the parts assembled.

Fig. 6 is a view of a modified wiper element detached.

Fig. 7 is a view in elevation of a third embodiment.

Fig. 8 is a section on line 8—8 of Fig. 7.

Fig. 9 is an enlarged detail of a portion shown in Fig. 7 but partly broken away and in sections.

Fig. 10 is a detail in perspective of a part used in the assembly.

Fig. 11 is a section on line 11—11 of Fig. 7.

Referring by reference characters to the drawing, numeral 15 is used to represent an arm. This arm is to be carried by a rockshaft preferably adjacent the lower edge of the windshield 17 in the usual way. The wiper is made up of a plurality of flexible members preferably of rubber such as 19 arranged in longitudinal alinement. Each member 19 has a head 21 more or less rectangular in shape. From the head extends a triangular part 23 having a wiping edge 25. Embracing the head is a clamp 27 which has side walls 29 gripping the rubber. Through the head 21 is a passage 31 rectangular in section through which passes a resilient strip 33 having its ends upturned sufficiently to engage the ends 35 of the clamp 27 or merely sufficient to engage the end of rubber member 19 in order to prevent the strip 33 from sliding out of the passage 31. Adjacent the middle of the clamp there is a rectangular part or stirrup 37 cut and integrally formed from the top portion of clamp 27 through which passes an elongated resilient strip 39 which is permanently curved. As shown in Figure 1 the resilient strip 39 has an initial curvature greater than the maximum curvature of the wiped area of the wieldshield, and in use yields to allow the wiper elements 19 to conform to the glass surface. To maintain the relationship between the head 37 and the strip 39 the side walls of head 37 are depressed as at 41. It will be seen that the rubber members 19 are not only shaped as stated but that their ends are flared longitudinally so that when assembled the ends overlap. The equivalent of the intermediate clamp is marked 43 and is described below in conjunction with the more detailed showing in Figure 11. It is formed with trunnion pins 47 to engage an attaching clip 45 carried by the end of the arm.

Any of the well-known spring expedients may be used to exert pressure on the arm to hold the rubber members against the glass. With the changing contour of the glass surface as the blade moves about the center of rotation of the arm the rubber members 19 are free to move relative to each other and the overlapping ends ensure a continuous wiping surface regardless of the surface of the glass. The flexibility of the curved strip 39 makes such accommodation of the members 19 possible and when the surface underlying the arm becomes parallel to the arm, the resiliency of strip 39 allows restoration of the device to the position it should occupy for a flat glass surface as shown for example in the modification in Figure 7.

In Figs. 4 and 5 is a similar form wherein instead of the strips 33 to assemble the clamp on the rubber element I use a button or rivet 51 its head placed in a conveniently shaped channel 53 in the rubber member 19'. The rivet extends from the channel through a hole 55 in the rubber and through a hole 57 in the strip 39' after which it is headed as shown at 59.

In Fig. 6 is shown a modified form of rubber element. It is marked 19''. It differs from the forms indicated by numerals 19 and 19' in that it is preformed to have a curvilinear edge 25' to fit a curved surface of the glass. When the wiper traverses a flat surface the edge flattens out as indicated on the figure.

The invention may be embodied in a form wherein the flexible members are not structurally separate. Figure 7 shows a continuous rubber wiping member marked 61. It is formed at uniformly spaced intervals with notches 63 so that the several parts may bend relative to each other to conform to the underlying glass surface. In this form clamps 27' are used and a resilient strip 33 secures each rubber part to its clamp. The elongated normally curved resilient strip 39' has slots 65 and each clamp has a depressed part 67 to be received in the slot and held in this position by a resilient portion 62 of the wiper member 61 whereby upon bending a slight relative axial movement between the clamp and the strip 39' may occur. The end of arm 15 carries a fitting 45 associated with pins 47 on the middle one of the clamps as shown by Fig. 11. In this form the rubber bends at the joints 63 to accommodate itself to the glass and the resilient strip 39' serves to bias the rubber strip to rectilinear position when the glass is flat as shown in Figure 7. When the glass is convexly curved the normally curved strip 39' will hold the wiping member to the curved glass surface.

In accordance with the forms described, the wiping rubber will conform to the glass surface whether the glass is flat or curved and it will adapt itself readily to changes in glass curvature which are encountered where the wiper arm swings about a pivot adjacent the edge of the windshield.

I claim:

1. In a windshield wiper assembly, an arm, an elongated yieldable member having a transverse width and being transversely rigidly connected at an intermediate point thereof to the end of said arm, a flexible wiper element having parts in longitudinal alinement and adapted to assume positions angularly related to each other jointly with the bending of said yieldable member, attaching means being secured to each of said flexible wiper element parts, U-shaped stirrups having the same transverse width as said yieldable member and having the free ends secured to said attaching means, said yieldable member extending through and supporting said stirrups without relative lateral movement.

2. The invention defined by claim 1, said parts being structurally independent.

3. The invention defined by claim 1, said parts being structurally independent and having adjacent overlapping ends.

4. The invention defined by claim 1, said parts being integrally united, notches constituting weakened connecting portions.

5. The invention as defined in claim 1, said parts being structurally independent, each part being preformed to have a normally curved engaging edge but adapted to become rectilinear when moving over a flat surface.

6. In a windshield wiper assembly, a flexible wiper element having a plurality of wide head portions in spaced alignment and a thin flexible wiping edge common to all of said head portions, a plurality of attaching means, one attaching means being fixed to each of said head portions, an elongated resilient member, each of said attaching means being secured in fixed transverse and lateral alignment with said resilient member, an arm for moving said wiper element, and a connector attached to said arm and one of said attaching means whereby said wiper assembly may be moved as a longitudinally flexible unit.

7. The invention defined by claim 6, said attaching means consisting of a U-shaped clamp, a stirrup portion projecting from the base of said U-shaped clamp, said stirrup having a flat portion in substantial alignment with said wiper edge, and said resilient member being positioned in contact with said flat portion of the stirrup and secured to said stirrup in fixed transverse and lateral alignment.

8. In a windshield wiper assembly, an elongated member, a flexible wiper element having a thin edge and a wide head portion, a U-shaped clamp engaging the head portion, a pair of spaced transverse cuts in the head portion of said U-shaped clamp, the portion of said clamp between said cuts being displaced outwardly to form a stirrup, and said elongated member being secured to said stirrup.

9. In a windshield wiper assembly, a flexible wiper element having a thin flexible wiping edge and a thicker head portion, a longitudinal passage in said head portion, an aperture in the portion of said head portion opposite to said flexible wiping edge communicating with said passage, and a rivet in said aperture having an enlargement fitting in said passage and having a portion secured to a member to support the wiper element.

10. In a windshield wiper assembly, an arm, an elongated yieldable member connected at an intermediate point thereof to the end of said arm, a flexible wiper element having parts in longitudinal alinement and adapted to assume positions angularly related to each other jointly with the bending of said yieldable member, attaching means being secured to each of said flexible wiper element parts, U-shaped stirrups secured to said attaching means, said yieldable member extending through and supporting said stirrups, said parts each having an edge to engage the windshield and a head, said attaching means comprising a clamp embracing each part, a metal strip extending through said part and having end portions substantially engaging said clamp, each clamp having an intermediate extension and means to secure said yieldable member to said extension.

11. In a windshield wiper assembly, an arm, an elongated yieldable member connected at an intermediate point thereof to the end of said arm, a flexible wiper element having parts in longitudinal alinement and adapted to assume positions angularly related to each other jointly with the bending of said yieldable member, attaching means being secured to each of said flexible wiper element parts, U-shaped stirrups secured to said attaching means, said yieldable member extending through and supporting said stirrups, each part having a recess, and said attaching means comprising a rivet in said recess and attached to said yieldable member.

12. In a windshield wiper assembly, a flexible wiper element having a thin flexible wiping edge and a thicker head portion, backing means secured to said wiper element, an aperture in said backing means, stirrup means having a transverse portion secured to said backing means over said aperture, a projection on the inside of the transverse portion extending toward said head portion, a member positioned in said stirrup, said member having an opening receiving said projection, and a portion of said flexible wiper element extending through said aperture and engaging said member to resiliently hold said member with the opening over said projection to secure said backing means and said member in interengaging position.

JOSUE R. PICON.

References Cited in the file of this patent

UNITED STATES PATENTS

| Number | Name | Date |
| --- | --- | --- |
| 1,565,802 | Hush | Dec. 15, 1925 |
| 2,274,277 | Rousseau | Feb. 24, 1942 |
| 2,303,694 | Horton | Dec. 1, 1942 |

FOREIGN PATENTS

| Number | Country | Date |
| --- | --- | --- |
| 345,867 | Canada | Nov. 6, 1934 |
| 427,383 | Great Britain | Apr. 23, 1935 |
| 433,467 | Great Britain | Aug. 15, 1935 |
| 820,156 | France | July 26, 1937 |